Dec. 14, 1948.  D. SHAILOR  2,456,453
INSULATION BREAK DETECTOR
Filed March 20, 1944
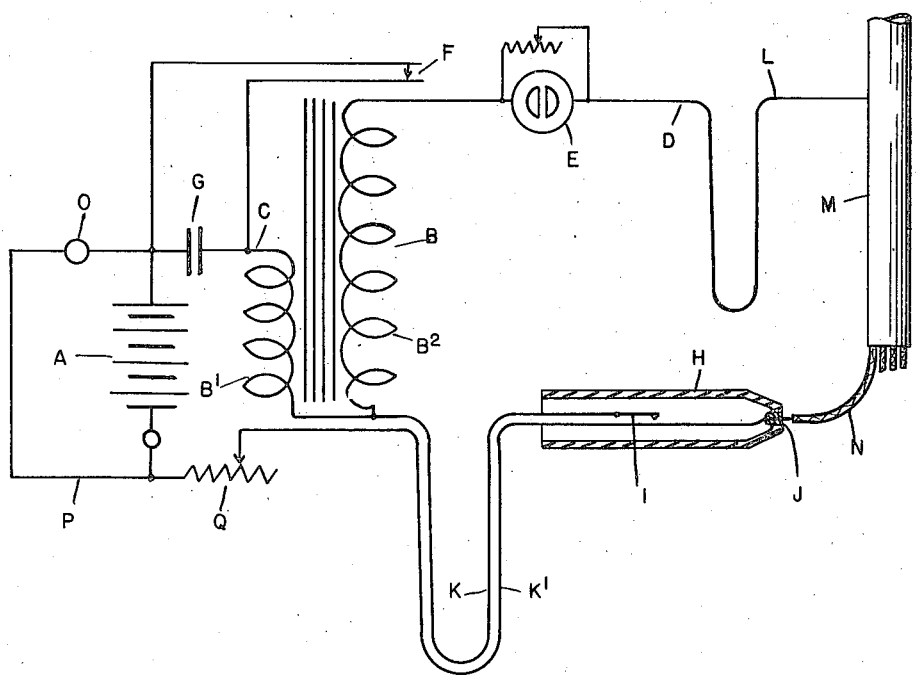
*INVENTOR.*
DOUGLAS SHAILOR
BY
ATTORNEYS Patented Dec. 14, 1948

2,456,453

UNITED STATES PATENT OFFICE 2,456,453

INSULATION BREAK DETECTOR

Douglas Shailor, Detroit, Mich., assignor to Briggs Manufacturing Company, Detroit, Mich., a corporation of Michigan Application March 20, 1944, Serial No. 527,281

2 Claims. (Cl. 175—183)

1

The invention relates to means for detecting any break in the insulation of an electrical conductor which might result in a short circuit.

It is the object of the invention to obtain a portable construction which can be carried to the point where the conductor to be tested is located and which is provided with means for quickly performing the test. For instance, in airplane manufacture it is customary to draw insulated conductors through metallic conduits installed in the plane and sometimes in so doing the insulation may be broken at one or more points thereby short-circuiting the conductor on the conduit. It is an object of my invention to provide means for readily testing either one or a plurality of insulated conductors passing through a conduit to determine whether there are any short circuits. With these objects in view the invention consists in the construction as hereinafter set forth.

In the drawing I have diagrammatically represented my improved insulation break detector as used for successively testing a plurality of insulated conductors passing through the same conduit.

A is a portable source of electrical current such as a storage battery, B is a transformer having a primary winding B' and a secondary winding $B^2$. C is the circuit for the primary winding and D the circuit for the secondary winding. In the latter is located an indicator preferably a neon-type lamp E. F is a vibrator or equivalent high frequency circuit breaker connected into the primary circuit, G is a condenser for protecting the contact points of said vibrator and H is a probe. This probe H is provided with a flexible outer casing formed of insulating material and adapted to be grasped by the hand of the operator. Within this casing is located a switch I biased to normally open but which may be closed by squeezing the casing H. There is also a socket contact J located in the nose of the casing. The primary circuit C is extended into the probe H through flexible conductors K and K' which are coupled to each other when the switch I is closed. One of these conductors also forms a portion of the secondary circuit which leads to the socket contact J. A flexible conductor L forming another portion of the secondary circuit is adapted to be grounded as, for instance, by connecting it to the conduit M through which the wires to be tested are drawn.

All of the parts thus far described may be mounted upon a portable frame or carriage (not shown) so as to be movable to the point where the testing is to be performed. The insulated

2 conductors N passing through the conduit M may then be successively tested by inserting the bared outer end of one of said conductors into the socket contact J after which the flexible casing H is squeezed to close the switch I. This will close the primary circuit automatically starting the high frequency current interrupter and thereby inducing a high voltage pulsating current in the secondary circuit. This secondary circuit will not, however, be closed unless there is some break in the insulation of the conductor N which will permit passage of current therethrough to the conduit M. If this is the case, then the induced current in the secondary circuit will illuminate the neon lamp which shows that the insulation is defective. On the other hand, if there is no break in the insulation of the conductor N through which current can pass to the conduit M, then the secondary circuit will not be closed and, consequently, the indicator lamp E will not be illuminated. To show that the battery A is in operative condition, a pilot light O is located in a shunt circuit P between the terminals of said battery. A rheostat Q in the primary circuit serves to regulate the ohmic resistance thereof. It is not necessary that the conductor N should be actually in contact with said conduit as the induced current in the secondary current is of sufficiently high voltage to jump a short gap. On the other hand, if there is no break in the insulation then the secondary circuit will not be closed and the lamp will not be illuminated. The instrument is thus very sensitive and will detect any break in the insulation which might later result in a short circuit.

The storage battery and circuit breaker as herein disclosed constitute a generator which produces pulsating current but the term "generator" as used in the claims may include any source of interrupted current used in connection with the invention.

What I claim as my invention is:

1. An insulation break detector for insulated electrical conductors, comprising an electric generator of pulsating current, a transformer operatively connected to said generator and having primary and secondary coils, a hand probe having a flexible casing, a circuit closing switch within said casing biased to open and a contact for electrical connection with an insulated conductor to be tested, a flexible connection between said transformer and probe including a plurality of electrical conductors forming portions of both primary and secondary circuits of said transformer, the secondary circuit extending to said contact and said switch being in series with both primary and secondary circuits, a flexible conductor for connecting the other terminal of said secondary coil with a conductor in proximity to the insulated conductor to be tested, and a neon lamp in series with said secondary circuit whereby pressure on the flexible casing of said probe will close said switch and primary circuit and will illuminate said lamp if the insulation of the conductor is defective.

2. A portable insulation break detector for one or more insulated conductors enclosed within a conduit of conducting material, comprising a storage battery, a high step up transformer operatively connected to said battery and including in the primary circuit thereof a circuit breaker, a hand probe having a flexible insulator casing, a circuit closing switch within said casing biased to open, a contact at the nose of said casing for electrical connection with any one of the insulated conductors within said conduit, a flexible connection between said transformer and said probe including a plurality of electrical conductors for connecting the primary circuit of said transformer to said switch to include the latter in said circuit and for also connecting one lead of the secondary circuit of said transformer to said contact, a flexible conductor connected to the other lead of said secondary circuit and adapted for connection with the conduit including said insulated conductors, and a neon lamp connected in series into said secondary circuit whereby any one of said insulated conductors may be engaged with said contact and pressure applied to said probe to close said switch whereupon said lamp will be illuminated if the insulation of said conductor is defective.

DOUGLAS SHAILOR.

REFERENCES CITED

The following references are of record in the file of this patent:

UNITED STATES PATENTS

| Number | Name | Date |
| --- | --- | --- |
| 974,712 | Seyranian | Nov. 1, 1910 |
| 1,561,483 | Pickard | Nov. 17, 1925 |
| 1,919,802 | Pfeiffer | July 25, 1933 |
| 1,950,484 | Clarvoe | Mar. 13, 1934 |
| 2,020,402 | Edwards et al. | Nov. 12, 1935 |
| 2,204,295 | Brockman | June 11, 1940 |
| 2,367,441 | Schwinn | Jan. 16, 1945 |